US007836284B2

(12) United States Patent
Dockser

(10) Patent No.: US 7,836,284 B2
(45) Date of Patent: *Nov. 16, 2010

(54) MICROPROCESSOR WITH AUTOMATIC SELECTION OF PROCESSING PARALLELISM MODE BASED ON WIDTH DATA OF INSTRUCTIONS

(75) Inventor: Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/150,729

(22) Filed: Jun. 9, 2005

(65) Prior Publication Data

US 2006/0282826 A1   Dec. 14, 2006

(51) Int. Cl.
*G06F 9/44* (2006.01)
(52) U.S. Cl. .......................................... 712/229; 712/43
(58) Field of Classification Search ................. 712/229
See application file for complete search history.

(56) References Cited

U.S. PATENT DOCUMENTS

| | | | | |
|---|---|---|---|---|
| 5,581,516 | A * | 12/1996 | Blackmon | 367/137 |
| 7,120,784 | B2 * | 10/2006 | Alexander et al. | 712/240 |
| 2003/0037221 | A1 * | 2/2003 | Gschwind et al. | 712/3 |
| 2003/0088799 | A1 | 5/2003 | Bodas | |
| 2003/0126260 | A1 * | 7/2003 | Husain et al. | 709/225 |
| 2004/0034760 | A1 * | 2/2004 | Paver et al. | 712/221 |
| 2004/0059956 | A1 | 3/2004 | Chakravarthy et al. | |
| 2004/0143410 | A1 * | 7/2004 | Clabes et al. | 702/107 |
| 2004/0215720 | A1 | 10/2004 | Alexander et al. | |
| 2004/0254965 | A1 * | 12/2004 | Giernalczyk et al. | 708/160 |
| 2005/0149701 | A1 | 7/2005 | Chen et al. | |
| 2005/0240699 | A1 * | 10/2005 | Yoder et al. | 710/200 |
| 2005/0283593 | A1 * | 12/2005 | Vasekin et al. | 712/240 |
| 2006/0123422 | A1 * | 6/2006 | Felter et al. | 718/105 |

OTHER PUBLICATIONS

Raman, S. K., Pentkovski, V., and Keshava, J. 2000. Implementing Streaming SIMD Extensions on the Pentium III Processor. IEEE Micro 20, (Jul. 4, 2000), 47-57.*

(Continued)

*Primary Examiner*—Eddie P Chan
*Assistant Examiner*—William B Partridge
(74) *Attorney, Agent, or Firm*—Peter Kamarchik; Nicholas J. Pauley; Sam Talpalatsky

(57) ABSTRACT

Automatic selective power and energy control of one or more processing elements matches a degree of parallelism to a monitored condition, in a highly parallel programmable data processor. For example, logic of the parallel processor detects when program operations (e.g. for a particular task or due to a detected temperature) require less than the full width of the data path. In response, the control logic automatically sets a mode of operation requiring a subset of the parallel processing capacity. At least one parallel processing element, that is not needed, can be shut down, to conserve energy and/or to reduce heating (i.e., power consumption). At a later time, when operation of the added capacity is appropriate, the logic detects the change in processing conditions and automatically sets the mode of operation to that of the wider data path, typically the full width. The mode change reactivates the previously shut-down processing element.

20 Claims, 2 Drawing Sheets

OTHER PUBLICATIONS

Raman, S.K. Pentkovski, V. Keshava, J. Implementing Streaming SIMD Extensions on the Pentium III Processor, IEEE Micro 20, Jul. 4, 2000, pp. 47-57.

International Search Report—PCT/US06/020614, International Search Authority—United States—Oct. 17, 2007.

Written Opinion—PCT/US06/020614, International Search Authority—United States—Oct. 17, 2007.

International Preliminary Report on Patentability—PCT/US06/020614, The International Bureau of WIPO, Geneva Switerland—Dec. 11, 2007.

Supplementary European Search Report—EP06771403, Search Authority—The Hague—Jul. 2, 2008.

* cited by examiner

(12)  United States Patent
US 7,836,284 B2

MICROPROCESSOR WITH AUTOMATIC SELECTION OF PROCESSING PARALLELISM MODE BASED ON WIDTH DATA OF INSTRUCTIONS

TECHNICAL FIELD

The present subject matter relates to techniques and equipment to automatically control active status (active and inactive) of one or a number of parallel data processing elements, e.g. of a Single Instruction, Multiple Data (SIMD) processor or the like, to match the degree of operational parallelism to a condition related to processing operations of the processor.

BACKGROUND

Many devices utilize integrated processors, such as microprocessors and digital signal processors, with complex arrangements of logic for performing data processing functions in accord with program instructions. Applications that require digital processing of multimedia data, such as video, audio or graphics, are becoming increasingly popular with consumers. Processing of such information, however, is intensive and has lead to processor architectures that are particularly suited to processing of such data.

Multimedia data typically includes a considerable amount of "parallel" data. Data is "parallel" where the individual units of data are not dependent on one another. Hence, processing of one unit of data is independent of processing of another unit, that is to say it need not wait for processing of any other unit to be completed. As a result, it is possible to perform a number of such independent data processing operations in parallel, at the same time. This feature of certain types of data, particularly the common forms of multimedia data, has led to the creation of parallel processors, which can simultaneously manipulate units of data in parallel. Parallel processing of multimedia data, for example, often helps to substantially increase overall processing speed.

A number of different architectures and instructions types have been developed for parallel data processing, particularly for multimedia applications. For example, Single Instruction, Multiple Data (SIMD) processors process data in parallel. Multimedia processing using SIMD instructions reduces the overall number of instructions required to execute a particular program task and speeds up performance by operating on multiple data elements in parallel. Although the processor may execute a single stream of instructions, the SIMD execution of those instructions concurrently processes multiple data streams in parallel.

Many applications of processors, including highly parallel data processing type devices like SIMD processors, place severe constraints on power and energy that the processor circuitry can consume. For example, portable devices, like cell phones, PDAs (portable digital assistants) and handheld video games, utilize battery power supplies. However, these devices include sophisticated microprocessors and in some cases use co-processors for multimedia related processing. Processor designs for such applications warrant careful control of power and energy consumption, typically, to extend life of a charge in the battery power supply as well as the life of the encompassing chip.

The architecture of a processor establishes a "width" of the data path through the processor, that is to say the maximum size of the data that can be processed. Parallel processing designs, such as SIMD processor architectures, are typically scaled to provide a data path width that corresponds to the maximum amount of parallel data that the device can process during a given cycle. Current SIMD processors are available that can process up to 128-bits of data at a time, which means that the overall width of the data path is 128-bits. However, at any given time, parallel portions of the processor may be processing smaller units of the data.

Although other sizes are known, common parallel processors today offer a 64-bit data path or a 128-bit wide data path. The data path is constructed of parallel processing elements, although the paths can be configured to handle data of different widths. A 128-bit data path, for example, can be broken up into small sizes, that is to say the processor can process sections of the 128-bit data that are 8-bits long, 16-bits long, 32-bits long or 64-bits long, as specified by the SIMD instructions written for the particular application. Using 8-bit instructions for example, a processor with a 128-bit wide data path can process sixteen 8-bit data units, in parallel. Conversely, with a 64-bit data path, if an instruction requires 128-bits, then the data may be divided into two 64-bit sections, and the instruction is sequentially executed on both 64-bit sections. The processing of each 64-bit section, of course may entail parallel processing, e.g. of eight 8-bit data units. By dividing the processing for the 128-bit instruction, the 64-bit wide data path can handle the 128-bit instruction, although the time for the divided processing is longer.

These operations allow optimum utilization of the parallel resources of the processor. Still, times occur when not all processing resources are needed for particular processing applications or times when full operation may be desirable. For example, many functions or applications of the processor simply do not require the full processing capability of the processor device or require the full processing capability only for a very limited time. In the 128-bit data path processor example, an application or a portion thereof may require only 64-bit data processing for some substantial period(s) of time, for example, because there is a limited amount of data parallelism, the amount of data to process is low, or there is not such a great need for speed. If the elements providing the 128-bit wide data path are all fully powered continuously, however, unused parallel elements are unnecessarily consuming energy.

As another example, full parallel processing operations involve intense activities of all of the parallel elements. Hence, all of the parallel elements are generating heat. Some processor designs, for example encapsulated in plastic packaging for low cost applications, may not be able to withstand heat above a certain temperature. Continuous high speed operations of the full array of parallel elements over an extended period may generate too much heat.

A parallel processor could be designed with a lower degree of parallelism than required for some applications, in order to be more efficient for applications that do not require the higher degree of parallelism. Although this compromise can reduce power consumption and thus heat generation, it results in wasted energy and poor performance when more parallelism is required.

Hence, there is a need for a technique to automatically adjust the parallelism of such a processor based on the processing task and/or environmental conditions.

SUMMARY

The teachings herein provide automatic activation/deactivation of one or more elements of a parallel programmable data processor, based on a detected processing condition. Essentially, the control matches the operative degree of parallelism to requirements of a task to be performed by the parallel data processor and/or to an environmental condition of the processor. For example, a parallel processing element can be shut down when not needed, to conserve energy, or when a temperature of the processor is too high, to allow the processor to cool. Aspects of these teachings encompass various methods of operation as well as parallel processing devices.

For example, a method of controlling parallelism of operations of a parallel data processor, involves monitoring one or more conditions related to processing performed through the parallel data processor. When the monitored condition or conditions correlate to a first state of processing, one or more instructions are executed in parallel in two parallel processing elements of the data processor providing a data path of a first width. When the monitored condition or conditions correlate to a second state of processing, one or more instructions are executed in a first one of the two parallel processing elements. Under this circumstance, data of a second smaller width is processed through the first element, while a second one the two parallel processing elements is inactive. In a typical implementation, deactivating the second element conserves energy and/or reduces heat generation (i.e., power consumption) by the processor.

Examples are disclosed that automatically control parallelism (activate and deactivate at least one parallel processing element), based on detected processing requirements or history. This approach may match the degree of parallelism to task requirements, as might be indicated by frequency of requirements for processing of data of the higher width in a new incoming set of instructions or in recently processed instructions. Other examples automatically control parallelism, based on a sensed environmental condition, such as the temperature of the device.

In a 128-bit Single Instruction, Multiple Data (SIMD) type parallel co-processor example, the parallel processing elements might be two 64-bit SIMD arithmetic logic units (ALUs). When both units are operational, the ALUs provide a 128-bit wide data path, and the co-processor operates in a 128-bit data processing mode. Control logic monitors a processing condition and detects a state thereof warranting a change to 64-bit operation. In response, one of the ALUs is automatically shut down, and the other ALU subsequently executes instructions for 64-bit wide data processing. Even in the 64-bit mode, however, the processor may handle instructions for processing of 128-bit data. For example, the methodology may further involve receiving a SIMD instruction calling for processing of 128-bit data and expanding that SIMD instruction into two instructions calling for processing of data of the 64-bit data width. The method then involves executing the two instructions resulting from the expansion in sequence through the one operational 64-bit ALU.

Hence, another method of controlling parallelism of operations of a parallel data processor might involve executing one or more instructions in parallel in two parallel processing elements of the data processor, so as to process data of a first width, sensing a condition related to processing through the parallel data processor, and deactivating the second parallel processing element upon detecting a state of the sensed condition. In this method, while the second parallel processing element is deactivated, an instruction calling for parallel data processing of data of the larger width is expanded into a plurality of instructions. Two such instructions, for example, call for parallel data processing of data of the second smaller width. The first parallel processing element executes the two instructions sequentially, while the second parallel processing element is deactivated.

As noted, the present teachings also encompass parallel data processors adapted to control the degree of parallelism in response to one or more monitored conditions. An example of such a device comprises a first processing element responsive to program instructions, for processing data of a first width, e.g. 64-bits in one implementation. The data processor also includes a second processing element responsive to program instructions, connected to operate in parallel with the first processing unit. The parallel operation of the two processing elements provides parallel processing of data of a second broader width (e.g. 128-bits). The processor also includes control logic for monitoring a condition related to processing operations of the data processor. As noted above, examples of the monitored conditions include environmental conditions such as temperature of the processor as well as task related conditions such a how frequently the processing relates to the second width (e.g. 128-bits of data). The logic selectively activates and deactivates the second processing element, based on the relationship of the monitored condition to a threshold.

The logic may be adapted to control the activating and deactivating of the second processing element so as to mitigate potential for thrashing. Examples are given where different thresholds are used (regarding temperature and/or regarding frequency of 128-bit instructions), for activating and deactivating the second ALU, so as to provide hysteresis. As another example, one or more of the thresholds used may be dynamically adjusted, e.g. in response to a timing measurement that might indicate potential thrashing problems. For example, if the task related condition threshold is too sensitive, and the second ALU is being restarted too soon after a most recent shut-down, the logic might increase the relevant threshold value.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various techniques disclosed herein relate to automatic selective power and energy control of one or more parallel processing elements, in a highly parallel programmable data processor. As discussed in more detail below, logic of the parallel processor detects when program operations (e.g. for a particular task or due to a detected temperature) require less than the full width of the data path. In response, the control logic automatically sets a mode of operation requiring a subset of the parallel processing capacity. At least one parallel processing element, that is not needed, can be shut down to conserve energy and/or reduce power consumption. At a later time, when operation of the added capacity is appropriate, the logic detects the change in processing conditions and automatically sets the mode of operation to that of the wider data path, typically the full width. The mode change reactivates the previously shut-down processing element.

Figure 1:
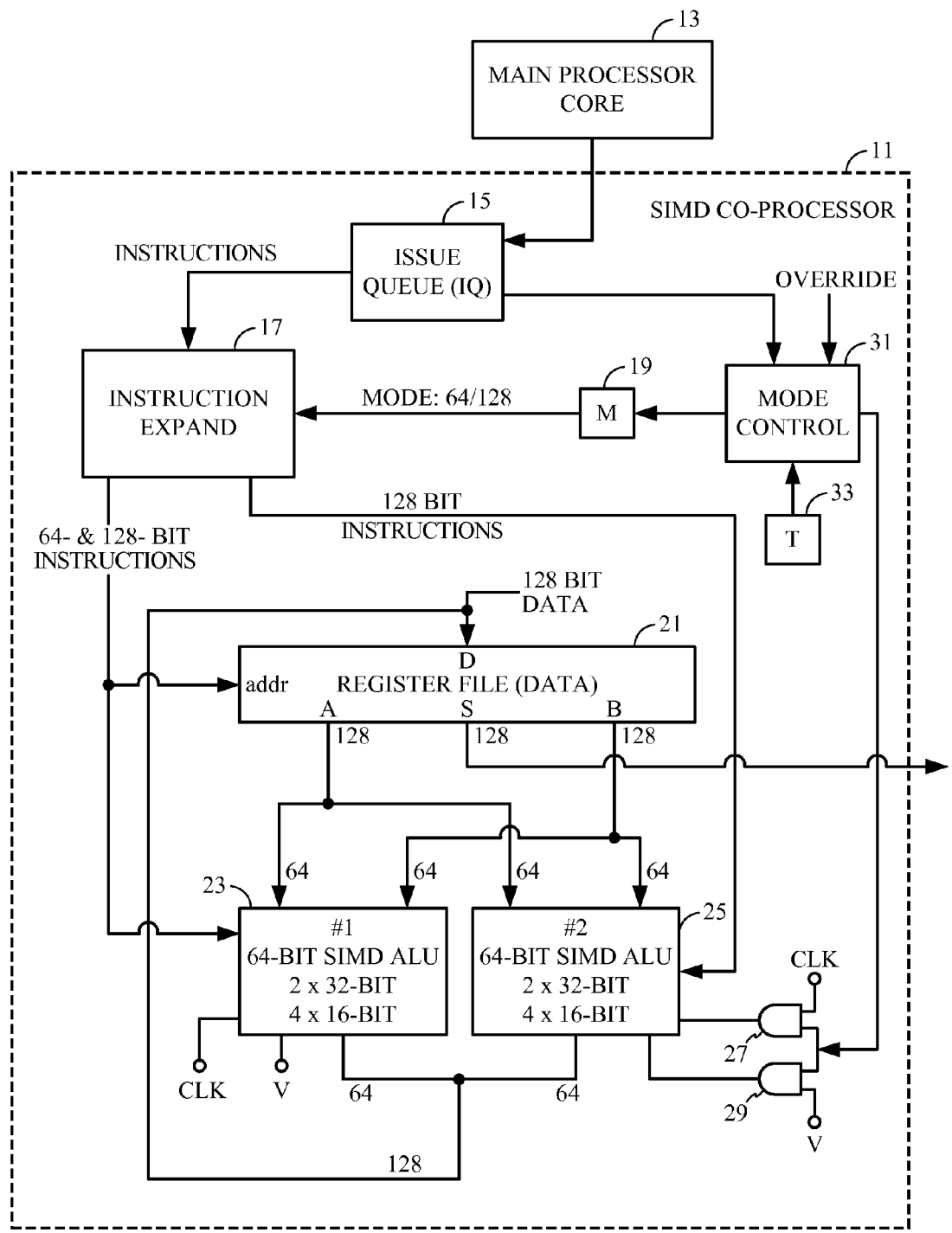
FIG. 1 is a functional block diagram, useful in understanding the automatic power and energy control of a parallel processing element, for example in a SIMD co-processor.

The present teachings are applicable to processor architectures having parallel data processing elements. Examples are discussed with respect to a SIMD type parallel processor architecture. Reference now is made in detail to the examples illustrated in the accompanying drawings and discussed below. As noted, SIMD designs currently available in the market typically provide 64-bit and 128-bit wide data paths. However, the present teachings are applicable to parallel processors having narrower or wider data paths. The functional block diagram of FIG. 1 illustrates components of a SIMD device that are useful in explaining the automatic parallel element power and energy control. Those skilled in the art will recognize that other elements would be included in an actual SIMD processor. In the example, the parallel processing device is implemented as a SIMD co-processor 11, e.g. for performing multimedia data processing operations under control of an associated main core processor 13.

Although not shown, a control may be provided to shut down the entire co-processor 11 when not being used by the application running in the main processor core 13, e.g. when there is no need for multimedia processing. Discussion here will focus instead on cases where at least some processing through the SIMD device 11 is called for, although different operating modes will utilize different levels of the parallel processing capabilities of the device 11.

In operation, the main processor core 13 will run one or more programs, which will call for multimedia processing of at least some data. The instruction set executed will include a SIMD extension, that is to say, a number of the instructions will be SIMD type processing instructions. The main processor core 13 issues these SIMD instructions to the co-processor 11, where they are initially placed in issue queue (IQ) 15. The issue queue is essentially a first-in-first out buffer device for storing a number of SIMD instructions in sequence, before execution.

The IQ stage 15 supplies instructions, in sequence, to an instruction expand stage 17. The SIMD co-processor 11 can provide parallel processing in a number of different data width modes. Although there may be more modes or variations in the data widths supported in each mode, the example shows a configuration of the co-processor 11 supporting 64-bit operation and 128-bit operation.

A flag bit (M) 19 indicates the current operating mode. The bit value may be held in a flip-flop or as a bit in a larger register, e.g. in a condition register. A typical example of the processor 11 will include a 32-bit control register (not separately shown), and the mode flag 19 may be one bit at a designated position in that register. As discussed later, the flag 19 is automatically set in response to a detected condition of the processor, e.g. the required level of parallelism for a particular processing task or a detected temperature of the device. The expand stage 17 is responsive to the state of the mode flag 19.

The SIMD co-processor also includes a register file 21, for holding operand data prior to processing, and an execution stage. In this simple example, the execution stage consists of two SIMD type arithmetic logic units (ALU) 23, 25. In the 128 mode, both ALUs 23 and 25 are active, whereas in the 64-bit mode, only the first (#1) ALU 23 is active.

In the 64-bit mode, the co-processor 11 can still handle a 128-bit SIMD instruction. For that purpose, the stage 17 'expands' the 128-bit instruction by breaking it into two instructions each structured for processing of 64-bits of data. In the 64-bit mode, the stage 17 dispatches all instructions to the ALU 23, including instructions that originally called for 64-bit wide data processing, as well as pairs of 64-bit instructions derived from expansion of any 128-bit instructions in the stream of SIMD instructions from the IQ stage 15. In the 128-bit mode, the stage 17 dispatches instructions to both the first and second ALUs 23, 25, so that the units 23 and 25 operate in parallel to provide a 128-bit wide SIMD data processing path.

Although the processor 11 executes a single stream of instructions, the SIMD execution of those instructions concurrently processes multiple pieces of data in parallel. Each ALU 23 or 25, for example, can concurrently operate on two 32-bit data words or on four 16-bit data words. When both units 23 and 25 are operating in parallel, the combined data processing capability can handle four 32-bit data words or eight 16-bit data words. Other combinations of parallel processing are also possible.

In a simple example, the register file 21 may comprise two 128-bit wide registers for data, although additional registers may be provided. Those skilled in the art will understand that the register file could comprise additional registers, for example, sixteen registers, each 128-bits wide. Control of the register file 21 splits each 128-bits of data and sends appropriate amounts to each of the ALUs 23 and 25. The D port of the file 21 is a write port. Via the port D, data that is 128-bits wide may be written to a register in the file 21, e.g. from a source (not shown) or from the results output by the ALUs. The S port of the file 21 is a read port. Via the port 5, data that is 128-bits wide may be read from a register in the file 21, e.g. to a sink (not shown) such as memory. The A and B ports of the register file 21 are read ports, for supplying split data (64-bits each) to the ALUs 23 and 25.

For 128-bit data processing instructions, the register file 21 supplies the low (least significant) half of the 128-bits of data to the second ALU 25, and sends the high (most significant) half of the data to the first ALU 23. For a 64-bit instruction, the processor can select either the low half or the high half of the 128-bits of data in the register file to supply to the first ALU 23. In the 128-bit mode, any 64-bit instructions go to the first (#1) SIMD ALU 23, and 128-bit instructions go to both SIMD ALUs 23 and 25. In the 64-bit mode, all 64-bit instructions go to the first SIMD ALU 23. Any 128-bit instructions are converted into two 64-bit instructions, which are fed sequentially to the first SIMD ALU 23.

The techniques disclosed here automatically control parallelism of operations of a parallel data processor, based on one or more sensed conditions related to processing performed through the parallel data processor. In the example, the automatic control selectively activates and deactivates the second (#2) ALU 25.

Operational status of the controlled parallel processing element, that is to say the second ALU (#2) 25 in the example of FIG. 1, may be controlled via one or more gates or switch circuits, represented generically by logic gates 27 and 29. Such a gate or switch selectively supplies and withdraws an enabling signal needed by the particular element. The gates 27 and 29 appear as AND gates in the drawing, but they are intended as generic representations of circuits for selectively coupling signals to the elements of the ALU 25. Such a circuit 27 or 29 may be a logic gate of any type, a switch, a combination thereof, or any other circuit configured to supply the appropriate type of signal to the functional elements of the ALU 25 in response to appropriate selection signals from mode control 31.

In this way, the mode control 31 controls the active status of the second ALU (#2) 25, in the example of FIG. 1. The mode flag itself could provide direct control of the selective activation and deactivation of gate(s) 27, 29 and thus of the ALU 25. However, in such a case the ALU would power up and power down immediately upon each transition of the mode of operation as indicated by changes of state of the mode flag 19. In most implementations, the ALUs 23 and 25 will comprise multi-stage pipeline units, and there may be a number of instructions in-flight in the ALU 25 when the flag 19 changes. The power and energy control logic is responsive to the mode flag 19, but it can provide a time lag following a state change, to allow for a smooth processing transition. For example, the logic of control 31 can monitor the operations of the ALU 25, so that upon detection of a transition to a 1 bit (shift from 128-bit mode to 64-bit mode), the control 31 will delay deactivating the ALU 25, until any remaining in-flight 128-bit instructions have been processed and passed out of that ALU. Although not shown, the logic of mode control 31 may also provide signals to other elements of the processor to control initial application of 128-bit instructions after a transition to the 128-bit mode, e.g. to allow for time needed to power-up the ALU 25.

The mode control 31 may be implemented to selectively control the status of the second ALU (#2) 25 in any of a variety of known ways, by selectively enabling and disabling any signal needed for operation of the unit via operation of an appropriate gate or switch circuit 27 or 29. For example, the ALU 25 can be selectively enabled and disabled by controlled gating of the clock signal (CLK), used to control circuit switching functions within, to the unit 25. The ALU 25 is disabled, in such an implementation, by cutting off the flow of the clock signal (CLK) through the gate 27 to the ALU 25, so that the circuitry of the unit 25 does not switch at all in response to clock signals. This reduces dynamic power consumption. To reduce leakage in such an implementation, the transistors of the ALU 25 may be designed with relatively high gate threshold voltages. Control based only on gating of the clock signal, however, may allow for relatively quick re-starts of the ALU.

Alternatively or in addition (as shown), the ALU state may be controlled by selective application or withdrawal of a connection to a terminal of the power supply. Although the effected connection could be that to ground or a negative supply voltage, for purposes of the example, the gate 29 controls supply of voltage V to the second (#2) SIMD ALU 25. Operation of the gate 29 by the mode control 31 turns power to the ALU 25 on and off in accord with the current mode of operation of the co-processor 11. In such an implementation, when the mode flag shifts to 1 (64-bit operation), the mode control 31 disables the ALU 25 after any remaining 128-bit instructions have been processed. At that time, the control 31 triggers the gate 29 to cut off a connection to the power terminal for supply voltage V, with respect to the circuitry of the ALU 25. This type of cut-off eliminates dynamic power consumption and leakage through the circuitry of that unit.

The first (#1) SIMD ALU 23 is active in both modes. Hence, that ALU is shown connected directly to the clock signal (Clk) and supply voltage (V), without gated control. However, power and/or clock signals to that processing element 23 also may be controlled, e.g. to permit shutdown thereof when the co-processor 11 is not needed.

The example of FIG. 1 shows a single parallel processing element, ALU 25, controlled based on the active mode of operation. Those skilled in the art will recognize that a given processor may include several similar controls for a number of parallel elements that may be inactive while the processor 11 operates on narrower data for considerable periods of time. Assuming a 128-bit maximum width, for another example, the first ALU might be implemented as two 32-bit ALUs. In that case, an additional control system similar to 27, 29 and 31 could control the second 32-bit ALU to provide additional selective deactivation of one 32-bit SIMD ALU, leaving only one unit active for 32-bit only operation.

The operation of the mode control 31 controls the parallelism of co-processor 11 in response to a state of at least one sensed condition. When the monitored condition is in a first state, SIMD instructions are executed in parallel in two parallel processing elements 23 and 25 of the data processor providing a 128-bit wide data path. When the monitored condition is in a second state, instructions are executed in the first (#1) parallel processing element 23. Under this circumstance, 64-bit wide data is processed through the first element, while the second parallel processing element 25 is inactive. The mode control 31 also sets the mode flag 19, to control operation of the instruction expand stage 17.

The mode status indicated by the flag 19 controls selective operations of the dispatch and expansion functions of the stage 17. For example, the processor could be configured to process all instructions in the form of 64-bit instructions, so long as the bit of flag 19 is a 1. If occasionally the stream of SIMD instructions includes a 128-bit instruction, the instruction expand stage 17 processor will break it down into two 64-bit instructions and send them through seriatim, to the ALU 23. When the bit of flag 19 is a 0, the stage 17 switches to the 128-bit mode, in which it directs instructions for 128-bit wide operations to both ALUs 23 and 25 without expansion. In this mode, if there is an occasional 64-bit instruction in the stream from the main processor 13, the stage 17 can dispatch the 64-bit instruction to the first ALU 23.

The mode status of the co-processor 11 set by mode control 31 controls selective activation and deactivation of at least one parallel processing element, in the example, the second ALU 25. The ALU 25 is active (powered) in the 128-bit mode, whereas it is unneeded in the 64-bit mode and is powered-down (deactivated) in that mode.

In the illustrated implementation, the mode control 31 is responsive to a condition related to a processing task, how frequently the processor handles instructions of a particular type. In this implementation, the mode control 31 also is responsive to an environmental condition, temperature. For example, the logic of the state machine or programmable device serving as the mode control 31 identifies the number of 128-bit instructions among the instructions in the queue stage 15. If the ratio or frequency of 128-bit instructions is at or above some pre-defined level, the mode control 31 sets the mode flag 19 to a 0 (128-bit mode) and activates the second ALU 25. By contrast, if the ratio or frequency of 128-bit instructions is at or below a pre-defined level, the mode control 31 sets the mode flag 19 to a 1 (64-bit mode) and initiates a procedure to deactivate the second ALU 25. Those skilled in the art will recognize that this task sensitive control function could use other monitored parameters, such as frequency or ratio of 64-bit instructions or frequency of either type of instruction in recent history (based on some number of instructions having been processed through the device 11).

For environmental monitoring, the exemplary processor 11 includes a temperature sensor 33. The sensor 33 provides a signal to the mode control 31. The control 31 activates and deactivates the ALU 25 and sets the mode flag 19, based on the level of the signal from the temperature sensor, essentially based on the relationship of the temperature to one or more threshold values. If the sensed temperature becomes too high while operating in the 128-bit mode, the control 31 can deactivate the ALU 25 to allow the device 11 to cool down. At a later time (e.g. when there is a lower temperature reading), and the task calls for 128-bit wide data processing, the control 31 can reactive the ALU 25 and set the flag 19 back to the 128-bit mode. Those skilled in the art will recognize that other environmental conditions may be sensed in place of or in addition to temperature.

Also, execution of an instruction can essentially override the automatic operation of the mode control 31, to allow the programmer to set the mode to a desired level of parallelism. The mode control receives an override command from one of the ALUs, 25, or from the main processor core 13. In response, the mode control 31 will set the mode flag 19, to indicate whether the stage 17 should operate in the 64-bit mode or not, and will provide a corresponding setting of the operational status (OFF or ON) of the ALU 25.

If the override is used, the program is written to set the mode of operation at appropriate points in the processing flow. The mode setting instructions may be written-in by the programmer, or a compiler may insert the mode setting instructions when the program is compiled into machine language code. The co-processor 11 may be designed to set a mode as an override, in response to mode instructions executed by one or both of the ALUs 23, 25, in which case the instructions are written in such a form that the core 13 issues those instructions to the co-processor 11 for execution. Alternatively, the co-processor 11 could be coupled to the main processor core 13, so that the core 13 sets the mode, in response to mode instructions executed by the main processor core 13. It is also possible that either processor 11 or 13 may set the mode based on such an override instruction.

Other variations on the override are also possible. For example, the override command from the main processor core 13 or the ALUs 23, 25 in response to a specific instruction might override the automatic setting based on the task-related condition, but not override control based on a critical environmental condition, e.g. so that the mode control 31 can reduce parallelism in response to excessive temperature even if contrary to the setting provided by the override based on an explicit instruction.

From the above discussion, it should be apparent that the mode control can automatically respond to states of a variety of monitored conditions related to the processor or its processing operations. Also, a variety of different algorithms may be designed to implement the desired parallelism control function. To fully appreciate the advantages of the present teachings, it may be helpful to consider an example.

Figure 2:
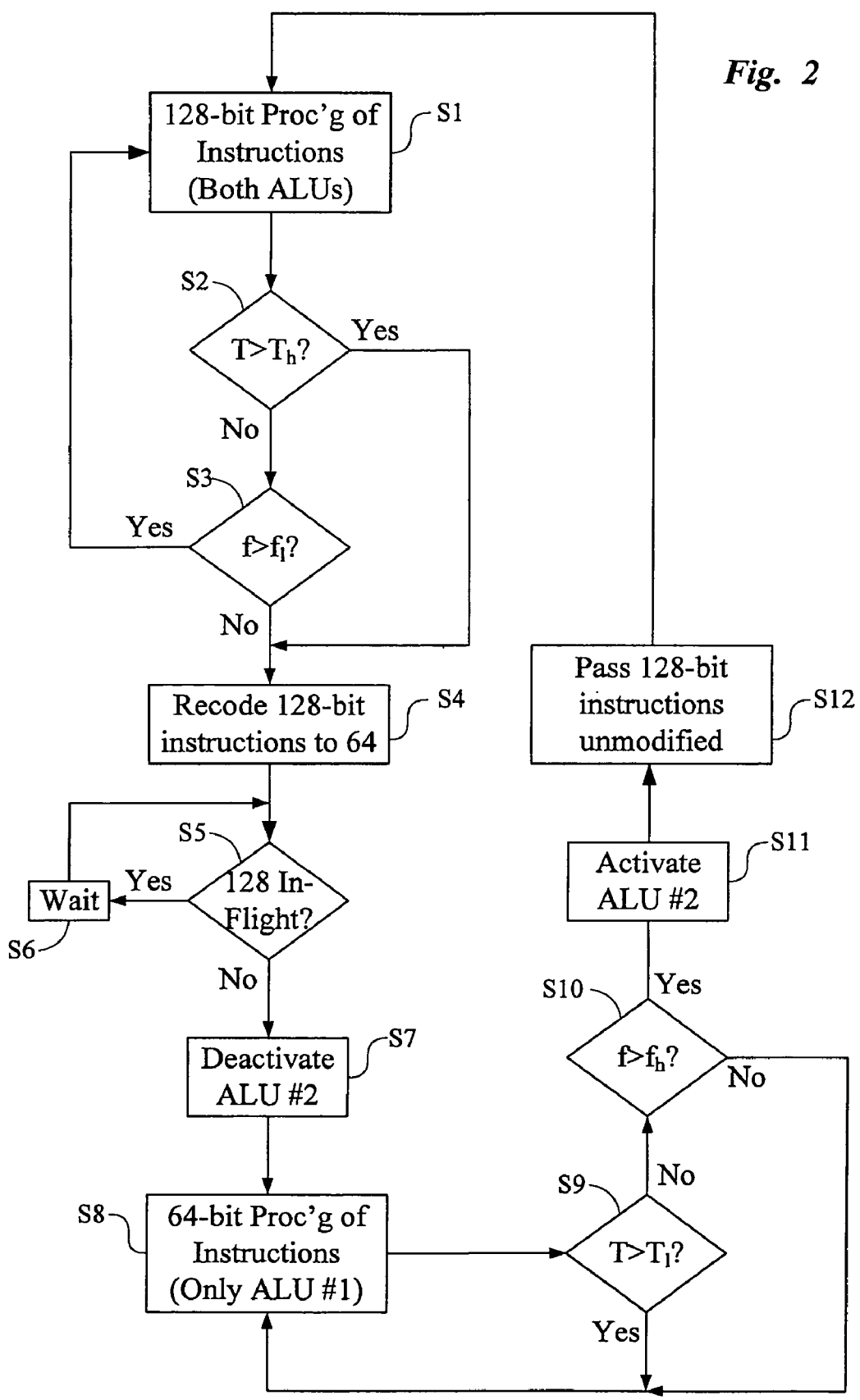
FIG. 2 is a simplified flow chart useful in understanding an example of control operations involved in automatically switching between two different levels of parallelism in the co-processor.

FIG. 2 is a flow chart showing a possible flow of the execution involved in automatically switching between two different levels of parallelism in the co-processor 11 of FIG. 1, based on frequency (or ratio) of instructions in the queue and the sensed processor temperature. For purposes of discussion, assume that initially (at S1) the processor is executing instructions in parallel in the two parallel arithmetic logic units 23 and 25. In this mode, the data processed may be up to 128-bits wide, that is to say as wide as the full data path provided by the units 23 and 25 working together. In this state, the mode control 31 compares the temperature signal value T to a high temperature threshold value $T_h$ (step S2). If the temperature is sufficiently low (the value T is not greater than the high temperature threshold value $T_h$), processing flows from S2 to S3.

The step S3 represents a determination of a task-related processing condition, in this case the number of 128-bit instructions in the queue. If the queue can hold up to eight instructions for example, when the IQ stage 15 is full, the frequency or ratio f would be the number of 128-bit instructions divided by 8. Of course, other measures of a task related condition may be used to determine when a task predominantly calls for processing of data of the 128-bit width. For example, if the queue length is constant, the number of 128-bit instructions in the queue may be used instead of the frequency. Historical measures may be developed based on similar analyses of some number of instructions already in-flight and/or processed through the ALUs, or such a history measure may be combined with the analysis of the instructions in the IQ stage 15.

For purposes of this discussion, assume that the logic monitors how frequent (f) the 128-bit instructions are in the IQ stage 15. In step S3, if the current value f is at or above a low threshold value $f_1$, processing flows from S3 back to S1, so that the co-processor 11 continues in the 128-bit mode of operation. Assuming an eight instruction maximum queue length, the low frequency threshold $f_1$ might be set at around 1/8, so as to keep the co-processor in an ongoing 128-bit mode so long as 1 of every 8 instructions is a 128-bit instruction. The threshold to stay in the 128-bit mode would typically be low. Even 1/16 could be an efficient criterion to stay in the 128-bit mode. Of course the threshold could be time dependent too, e.g. to require 2 or more 128-bit instructions in every 8 instructions for some number of processing cycles. In the illustrated flow, the processing represented by steps S1 to S3 will continue, that is to say with the co-processor operating in the 128-bit wide data processing mode, so long as the temperature remains at or below the threshold $T_h$ and the frequency of 128-bit instructions remains at or above the threshold $f_1$.

If the logic forming the mode control 31 detects that the temperature T exceeds the threshold $T_h$, then processing flows from step S2 to processing step S4. Similarly, if the logic forming the mode control 31 detects that the frequency f of 128-bit instructions falls below the threshold $f_1$, processing flows from step S3 to processing step S4. In either case, at S4, the instruction expand block, 17, begins the conversion of subsequent 128-bit instructions if any into pairs of 64-bit instructions. At step S5, the mode control 31 checks the second arithmetic logic unit (ALU #2) 25 to determine if there are any remaining in-flight 128-bit instructions that need to be processed and passed out of that arithmetic logic unit 25. If so, the logic waits (S6) and checks again. This monitoring (S5-S6) continues until there are no longer any remaining in-flight 128-bit instructions to be processed by the second arithmetic logic unit (ALU #2) 25, at which point processing flows to step S7.

In step S7, the mode control 31 deactivates or shuts down the second ALU type processing element 25, to conserve energy and/or to reduce generation of heat. Further processing runs in the 64-bit mode (S8), as discussed above. For example, while the second arithmetic logic unit 25 is inactive, the processor 11 executes one or more instructions in the first arithmetic logic unit 23, so as to process 64-bits of data. Any 128-bit instructions received in this mode are expanded and processed sequentially as two 64-bit instructions (as begun at S4).

While the co-processor operates in the 64-bit mode, the mode control 31 continues to check the temperature and how frequently 128-bit instructions are being received in the IQ stage 15. The measured temperature is compared to a threshold in step S9, and the detected frequency of 128-bit instructions is compared to a threshold in step S10. The same threshold could be used in S9 as was used in S2; and/or the same threshold could be used in S10 as was used in S3. However, use of the same thresholds may lead to switching the ALU 25 on and off in response to every small change in one or both of the monitored parameters, which would result in excessive switching, often of short durations.

Waking or powering up the ALU 25 from a shut-down state takes time and consumes energy. In some cases, it could take more energy to power-up the element 25 than to just keep it on for some short period of time. Also, it takes time to power a component back up. The resulting delay or latency in restarting the ALU could result in processor stalls, which degrades performance. Hence, it is desirable to ensure that the controlled parallel processing element, the ALU 25 in our example, is not repeatedly shut down only to be awoken a short while later. Repeated power-down and power-up may be termed "thrashing." The illustrated examples use different thresholds for the comparisons in the different modes of operation, so as to provide some hysteresis in the switching operations, to reduce switching events and potential for thrashing. As discussed more later, the logic of the mode control 31 may implement other or additional anti-thrashing strategies.

Returning to the specific example, in step S9, the mode control 31 compares the current temperature measurement T to the threshold $T_l$, which is somewhat lower than the threshold $T_h$. If the measured temperature T is still above the cool lower threshold $T_l$, processing continues in the 64-bit mode (S8). Typically, the temperature will continue to drop in this mode. When the co-processor has cooled down sufficiently, mode control 31 determines that the measured temperature T is at or below (no longer greater than) the lower threshold $T_l$, and processing flows from S9 to Since the processor is now sufficiently cool to enable a return to 128-bit operation, the mode control next determines (at S10) if the processing task warrants 128-bit operations. Hence, at S10 in our example, the mode control compares frequency or ratio (f) of the 128-bit type instructions in the IQ stage 15, to the higher threshold value $f_h$. Assuming again an eight instruction maximum queue length, the high frequency threshold might be set at around ⅜, so as to keep the co-processor in an ongoing 64-bit mode so long as there are not more than three 128-bit instructions in every 8 instructions. Of course the threshold could be time dependent too, e.g. to require 4 or more 128-bit instructions in every 8 instructions for some number of processing cycles to trigger transition to 128-bit operation.

If f is less than or equal to (not yet greater than), the threshold value $f_h$, then there is not sufficient demand to justify 128-bit operations, even though the temperature of the processor is safe. Hence, processing flows from S10 back to S8, so that the co-processor 11 continues in the 64-bit mode of operation. The processing represented by steps S8 to S10 will continue, that is to say with the co-processor operating in the 64-bit wide data processing mode, so long as either of the thresholds is not met, that is to say until the temperature is sufficiently low and the frequency of 128-bit instructions is sufficiently high to warrant transition to the 128-bit mode of operation.

When the temperature is at or below the threshold $T_l$ and the frequency of 128-bit instructions exceeds the threshold $f_h$, processing flows through S9 and S10 to step S11. In step S11, the control logic 31 activates the second arithmetic logic unit (ALU #2) 25. At this time (S12), 128-bit instructions will pass to the ALUs without modification (further recoding into two 64-bit instructions is no longer necessary). In this state, processing returns to step S1 where further operations utilize the 128-bit instruction mode.

As noted earlier, the logic of the mode control 31 may implement other anti-thrashing strategies instead of or in combination with the hysteresis provided by the differences in the threshold values. For example, the threshold values may be adjusted in response to measures that might indicate thrashing, e.g. the interval of time during which the ALU is shut-down in response to a low occurrence rate of 128-bit instructions.

The present teachings have a wide range of applications. For example, the power and energy control may be implemented in other parallel processors and in processors having different data path widths. Also, the example of the parallel processor discussed above provided a co-processor associated with a main processor core. Those skilled in the art will understand, however, that the parallelism control techniques discussed herein are not limited to co-processor implementations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   monitoring a processor to detect a plurality of sensed conditions, wherein the processor supports a first processing mode for processing data of a first width and a second processing mode for processing data of a second width, wherein the first width exceeds the second width, and wherein the plurality of sensed conditions includes:
      a plurality of instructions at an instruction queue comprising a first plurality of instructions corresponding to the first width of data, the first plurality of instructions satisfying a level; and
      an operating temperature of the processor being below a threshold;
   when the plurality of sensed condition is detected:
      selecting the first processing mode; and
      continuing in the first processing mode until at least one of the plurality of sensed conditions is no longer detected; and
   when at least one of the plurality of sensed conditions is not detected:
      selecting the second processing mode;
      selectively disabling at least one instruction execution unit used to support processing data of the first width in the first processing mode;
      instructions corresponding to the second width of data; and
      continuing in the second processing mode until the plurality of sensed conditions is detected.

2. The method of claim 1, wherein the first data width is twice as large as the second data width.

3. The method of claim 2, wherein the first data width is 128 bits and the second width is 64 bits.

4. The method of claim 2, wherein the first processing mode comprises using at least twice as many execution units as the second processing mode.

5. The method of claim 1, wherein the first plurality of instructions satisfies the level when a first count of the first plurality of instructions relative to a second count of a second plurality of instructions that correspond to the second width of data equals or exceeds a ratio.

6. The method of claim 1, further comprising setting a mode flag when the plurality of sensed conditions is detected, wherein the mode flag identifies when the processor operates in the first processing mode or operates in the second processing mode.

7. The method of claim 6, further comprising receiving an override instruction that overwrites the setting of the mode flag.

8. The method of claim 1, wherein at least one of the level of the first plurality of instructions and the threshold of the operating temperature of the processor is determined based on whether the first processing mode or second processing mode is selected.

9. The method of claim 1, wherein selectively disabling the at least one instruction execution unit comprises monitoring the at least one instruction execution unit to determine when no in-flight instructions corresponding to the first width of data remain to be processed at the at least one instruction execution unit and selectively disabling the at least one instruction execution unit based on the determination.

10. A method comprising:
monitoring a plurality of instructions at an instruction queue of a processor, wherein the processor supports a first processing mode for processing data of a first width and a second processing mode for processing data of a second width, wherein the first width exceeds the second width;
determining whether the plurality of instructions comprises a first plurality of instructions corresponding to the first width of data that satisfies a level;
in response to the first plurality of instructions satisfying the level:
selecting the first processing mode; and
continuing in the first processing mode until the first plurality of instructions is determined to not satisfy the level; and
in response to the first plurality of instructions not satisfying the level:
selecting the second processing mode;
selectively disabling at least one instruction execution unit used to support processing data of the first width in the first proessing mode;
expanding instructions that correspond to the first width of data into multiple instructions corresponding to the second width of data; and
continuing in the second processing mode until the first plurality of instructions is determined to satisy the level.

11. The method of claim 10, wherein the first plurality of instructions reaches the level when a first count of the first plurality of instructions relative to a second count of a second plurality of instructions that correspond to the second width of data at the instruction queue equals or exceeds a ratio.

12. The method of claim 10, further comprising selecting the second processing mode in response to an operating temperature of the processor exceeding a threshold.

13. The method of claim 10, further comprising one of the first processing mode and the second processing mode in response to receiving an override instruction that specifies a selection of the first processing mode or the second processing mode.

14. The method of claim 10, wherein selectively disabling the at least one instruction execution unit comprises monitoring the at least one instruction execution unit to determine when no in-flight instructions corresponding to the first width of data remain to be processed at the at least one instruction execution unit selectively disabling the at least one instruction unit based on the determination.

15. A processor comprising:
a plurality of instruction execution units;
an instruction queue configured to queue instructions comprising first instructions corresponding to a first data width and second instructions corresponding to a second data width, wherein the second data is less than the first data width;
an instruction expand element configured to selectively expand the first instructions into multiple instructions corresponding to the second data width; and
control logic coupled to the instruction queue, the plurality of instruction execution units,
and the instruction expand element, wherein the control logic is configured to:
when a plurality of the first instructions reaches a level, select a first processing mode that comprises using a first plurality of instruction execution units; and
when the plurality of the first instructions fails to reach the level, select a second processing mode wherein:
the instruction expand element expands each of the first instructions in the instruction queue;
a second plurality of instruction execution units is used, wherein the second plurality of instruction execution units is less than the first plurality of execution units;
one or more of the plurality of instruction execution units not used to process the instructions corresponding to the second data width are shut down; and
the one or more of the plurality of instruction execution units are reactivated when the plurality of the first instructions reaches the level.

16. The processor of claim 15, wherein the control logic is further configured to monitor a processor operating temperature, wherein the first plurality of instruction execution units is active when the plurality of the first instructions reaches the level and when the processor operating temperature does not reach a threshold.

17. The processor of claim 16, further comprising a mode flag, wherein:
the mode flag is set to a first status to activate the first plurality of instruction execution units when the plurality of the first instructions reaches the level and when the processor operating temperature does not reach the threshold; and
the mode flag is set to a second status to shut down the one or more of the plurality of instruction execution units when the plurality of the first instructions fails to reach the level or when the processor operating temperature exceeds the threshold.

18. The processor of claim 17, wherein the mode flag is configured to respond to an override instruction that sets the mode flag to one of the first status and the second status independent of at least one of whether the plurality of first instructions reaches the level and whether the processor operating temperature reaches the threshold.

19. The processor of claim 16, wherein at least one of the level of the plurality of first instructions and the threshold of the processor operating temperature is determined based on whether the processor operates in the first processing mode or in the second processing mode.

20. The processor of claim 15, wherein the control logic is configured to shut down at least one instruction execution unit that is not used to process the instructions corresponding to the second data width when no in-flight instructions corresponding to the first width of data remain to be processed.

* * * * *